United States Patent [19]
Bai

[11] Patent Number: 5,533,231
[45] Date of Patent: Jul. 9, 1996

[54] CONCEALABLE CASTER OF BAGGAGE

[76] Inventor: Yang-Fong Bai, 1F, 125-6, Sec. 1, San Min Rd., Taichung, Taiwan

[21] Appl. No.: 304,121

[22] Filed: Sep. 12, 1994

[51] Int. Cl.$^6$ .............................. B60B 33/06; B62B 1/00
[52] U.S. Cl. ...................... 16/34; 16/32; 16/23; 16/18 B; 280/655.1; 280/47.315
[58] Field of Search ................................... 16/34, 32, 23, 16/18 B, 18 R; 280/655.1, 47.315, 37

[56] References Cited

U.S. PATENT DOCUMENTS

| | | | |
|---|---|---|---|
| 2,788,219 | 4/1957 | McClellan | 16/34 |
| 4,254,850 | 3/1981 | Knowles | 16/34 |

*Primary Examiner*—M. Rachuba
*Assistant Examiner*—Adesh Bhargava

[57] ABSTRACT

A concealable baggage caster comprises a caster housing fastened to the bottom edge of a baggage and provided therein with a space for housing a caster and a caster frame. The caster housing is provided respectively in the left and the right side walls thereof with an elongate slot, a pivoting hole and a locating hole. The caster is pivoted between the two lugs of the caster frame which is mounted on a shaft received in the pivoting holes of the caster housing and the pivoting holes of the caster frame. An action plate is fastened pivotally to the action holes of the caster frame. Two guiding pieces and two fevers are pivoted respectively on the two pivoting shafts which are slidably received in the elongate slots of the caster housing. Each of two levers has a central fulcrum hole dimensioned to receive therein a shaft which is also received in the locating holes of the caster housing. The two levers are jointly provided with a pivoting point fastened pivotally with one end of an inner control rod of a drag frame of the baggage.

2 Claims, 7 Drawing Sheets

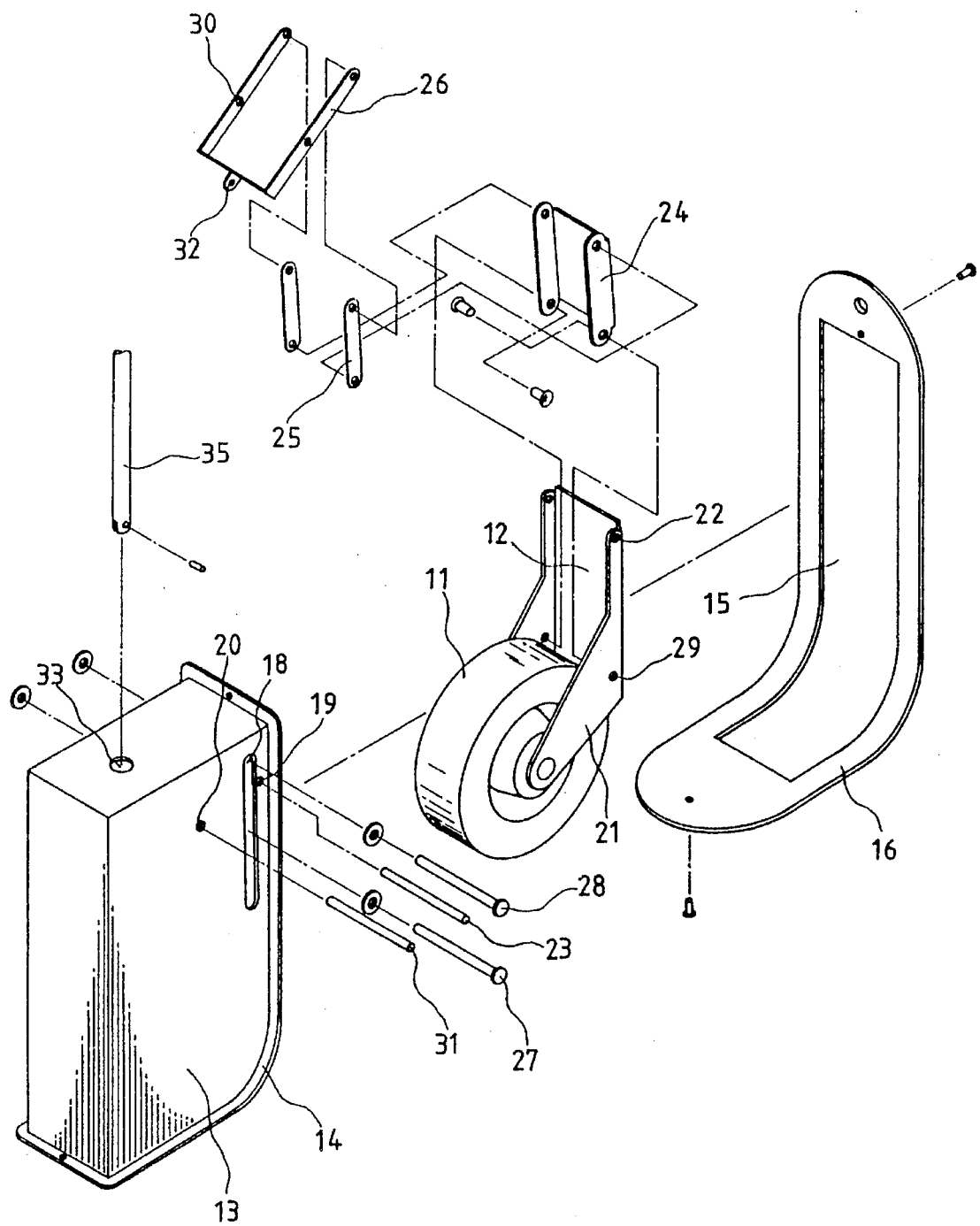
F I G. 1

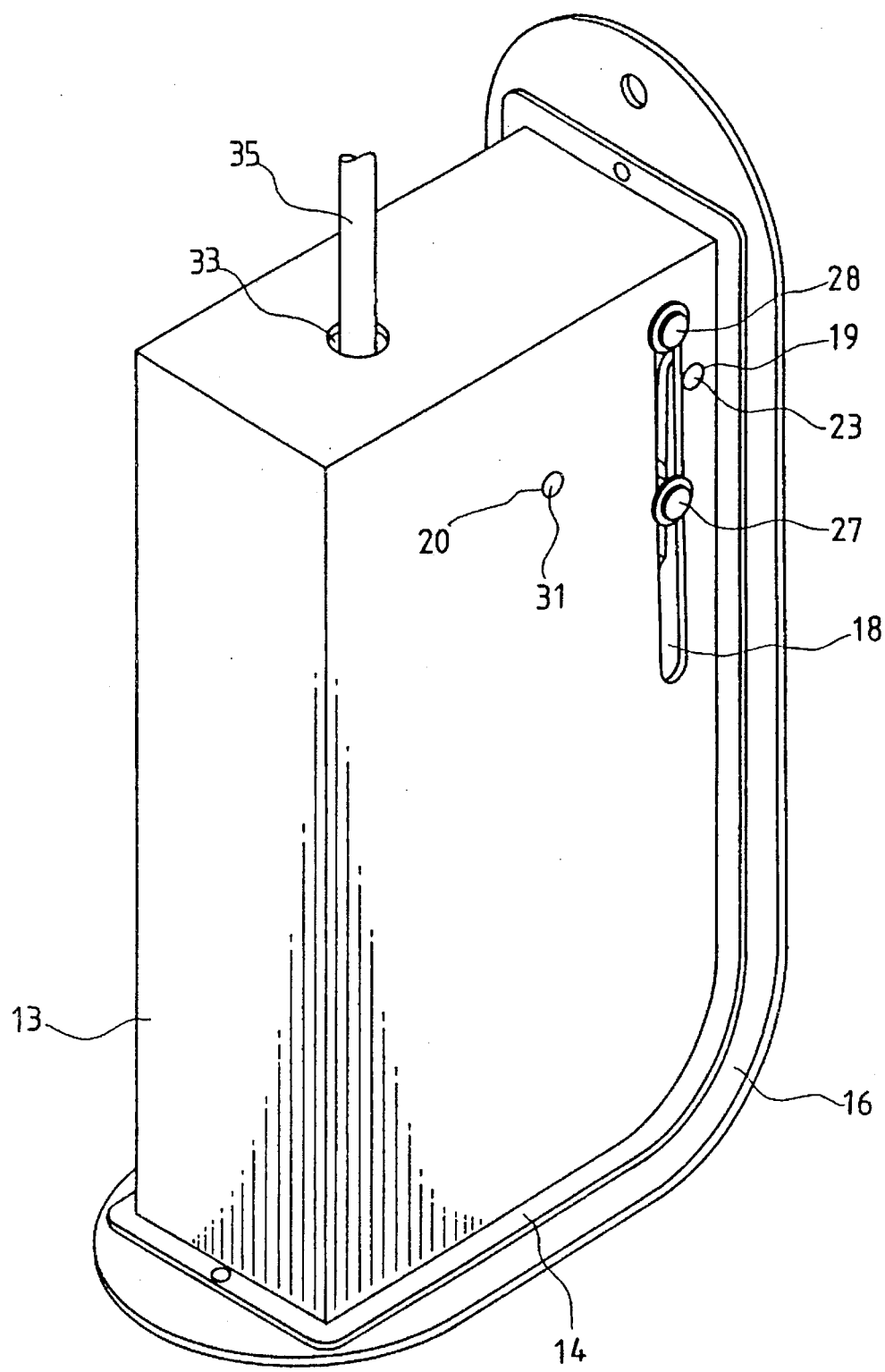
F I G. 2

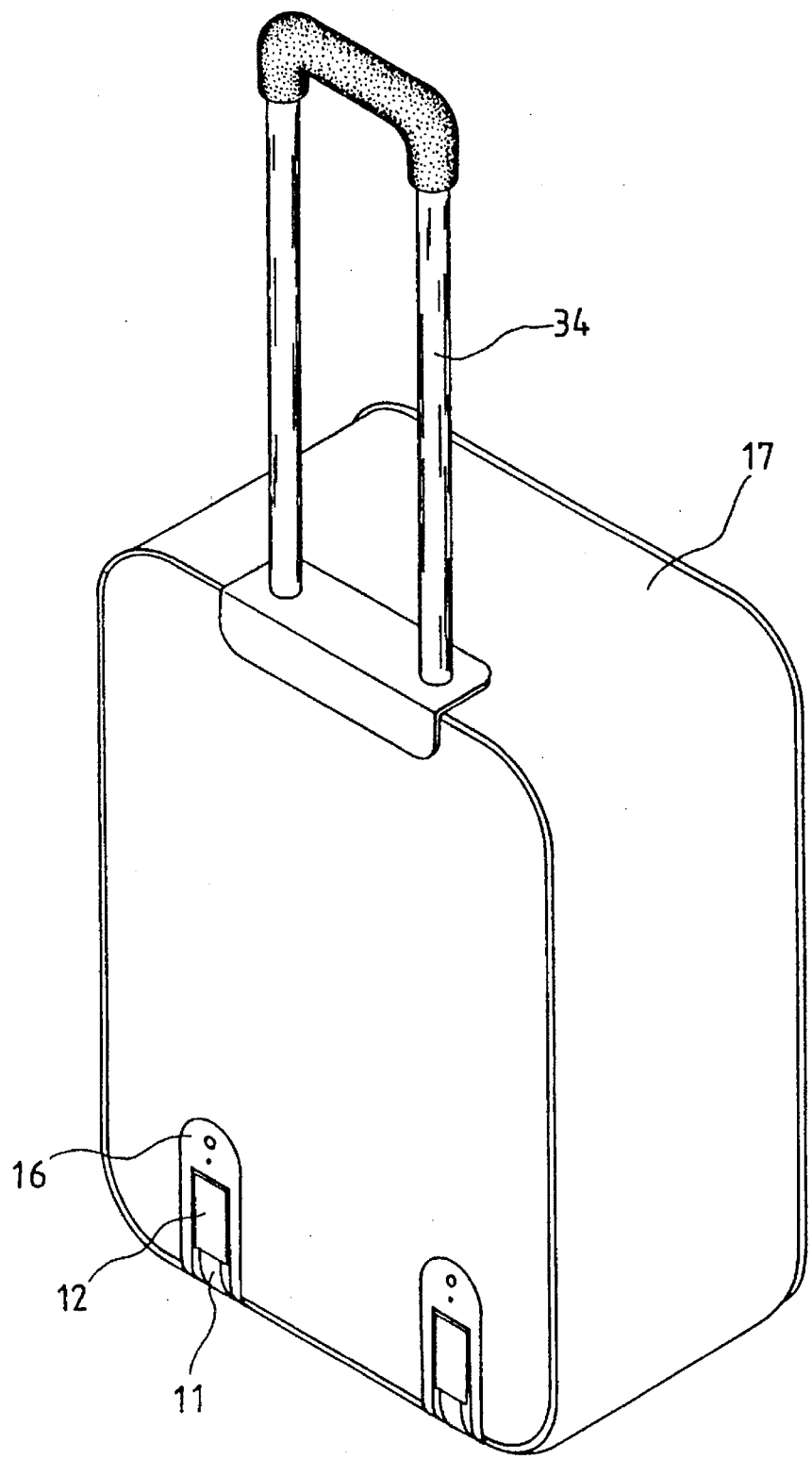
F I G. 3

5,533,231

CONCEALABLE CASTER OF BAGGAGE

FIELD OF THE INVENTION

The present invention relates generally to a baggage caster, and more particularly to a baggage caster which can be concealed when not in use.

BACKGROUND OF THE INVENTION

Almost all travelers, especially the frequent travelers, would agree that a caster is a very useful and helpful adjunct to a baggage, especially the bulky one. However, a baggage caster can be at times a nuisance in view of the fact that a baggage having a caster can not be kept still, and that the caster undermines the esthetic effect of the baggage.

SUMMARY OF THE INVENTION

It is therefore the primary objective of the present invention to provide a baggage with one or more casters which can be concealed when not in use.

In keeping with the principle of the present invention, the foregoing objective of the present invention is attained by a concealable baggage caster, which comprises a caster housing fastened to the bottom edge of a baggage and provided therein with a space for housing a caster and a caster frame. The caster housing is provided respectively in both sides thereof with an elongate slot, a pivoting hole and a locating hole. The caster is pivoted between the two lugs of the caster frame which is mounted on a shaft received in the pivoting holes of the caster housing and the pivoting holes of the caster frame. An action plate is fastened pivotally to the action hole of the caster frame. Two guiding pieces and two levers are pivoted respectively on the two pivoting shafts which are slidably received in the elongate slots of the caster housing. Each of the two levers has a central fulcrum hole dimensioned to receive therein a shaft which is also received in the locating holes of the caster housing. The two levers are jointly provided with a pivoting point, which is pivoted to one end of an inner control rod of a drag frame of the baggage.

The foregoing objective, features and functions of the present invention will be more readily understood upon a thoughtful deliberation of the following detailed description of the present invention in conjunction with the accompanying drawings.

BRIEF DESCRIPTION OF THE DRAWINGS

FIG. 1 shows an exploded view of the present invention.

FIG. 2 shows a perspective view of the present invention in combination.

FIG. 3 shows a schematic view of an embodiment of the present invention.

DETAILED DESCRIPTION OF THE INVENTION

Figure 4:
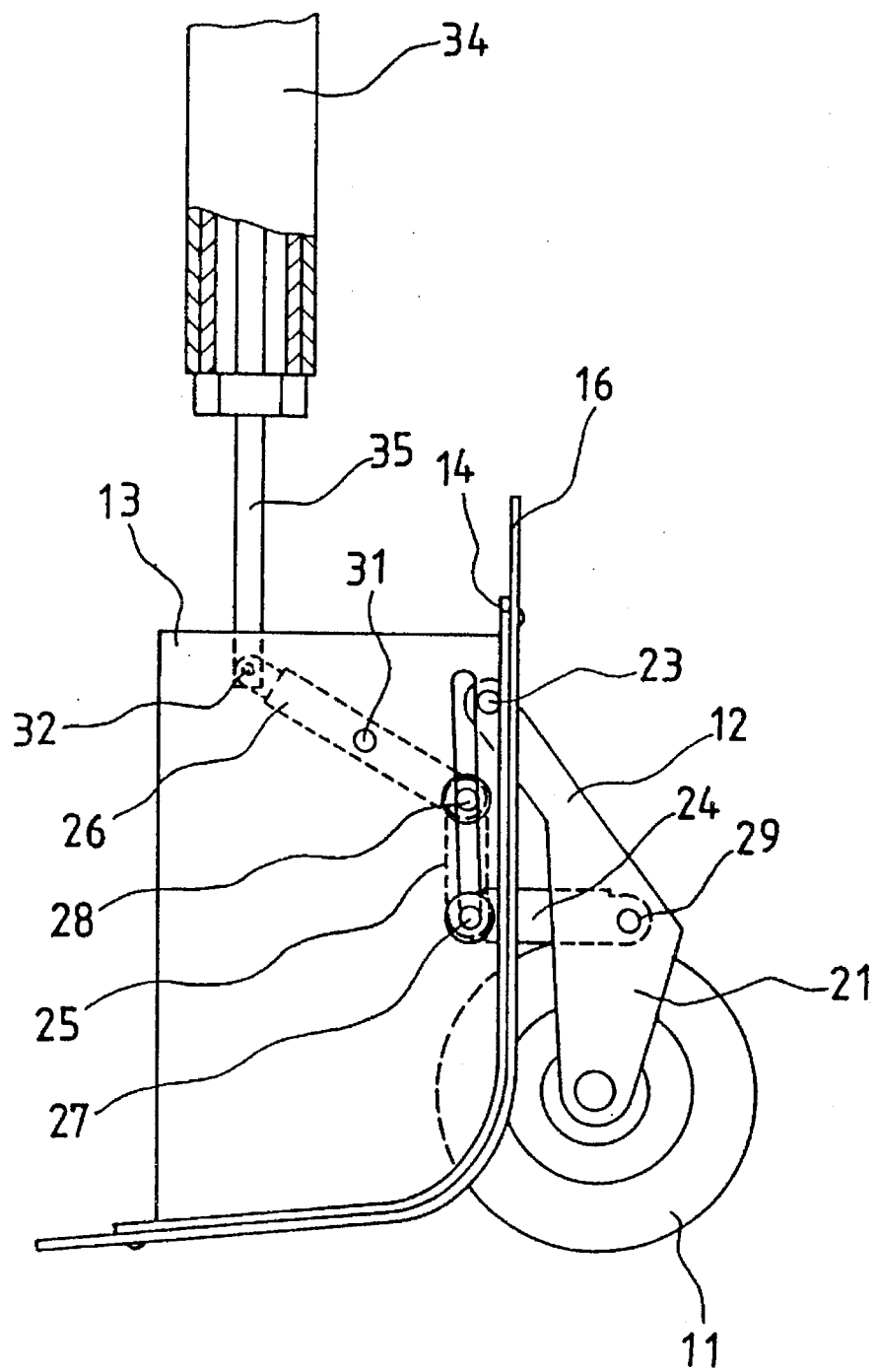
FIG. 4 shows a schematic view of the caster in use according to the present invention.

As shown in FIGS. 1–3, a concealable caster 11 of the present invention and a caster frame 12 on which the caster 11 is mounted are housed in a caster housing 13 which has an open outer side and an open bottom side. Both open outer side and open bottom side are provided respectively with a folded edge 14. The caster housing 13 is fastened securely to the bottom edge of a baggage 17 in conjunction with an L-shaped fastening piece 16 having a slot 15. The caster housing 13 is provided respectively in the left and the right side walls thereof with an elongate slot 18, a pivoting hole 19 and a locating hole 20. The caster 11 is pivoted between two lugs 21 of the caster frame 12. Located at the top end of the caster frame 12 are two pivoting holes 22 which are opposite to each other and are dimensioned to receive therein a shaft 23 mounted pivotally in the pivoting holes 19 of the caster housing 13. An action plate 24 is pivoted at the front end thereof with the lugs 21 of the caster frame 12 by means of two action holes 29 located oppositely in the caster frame 12 and two action pins engageable with the action holes 29. Two pivoting shafts 27 and 28 are slidably disposed in the elongate slots 18. Each of two levers 26 is fastened to the caster housing 13 by a shaft 31 which is received in a central fulcrum hole 30 of the lever 26 and the locating holes 20 of the caster housing 13. The two levers 26 are provided jointly with a pivoting point 32, which is fastened pivotally with one end of an inner control rod 35 of a drag frame 34 of the baggage 17.

The concealed caster 11 of the present invention can be pulled out by pulling upwards the inner control rod 35 of the drag frame 34 so as to cause the levers 26 to actuate two guiding pieces 25, which are mounted on ithe pivoting shaft 28, to slide downwards along the elongate slot 18 to push the action plate 24. As a result, the caster frame 12 is actuated by the action plate 24 to slide outwards on the shaft 23 until the caster 11 is completely moved out of the caster housing 13. In the meantime, the action plate 24 is so located horizontally as to hold the caster 11 securely in place, as shown in FIG. 4.

Figure 5:
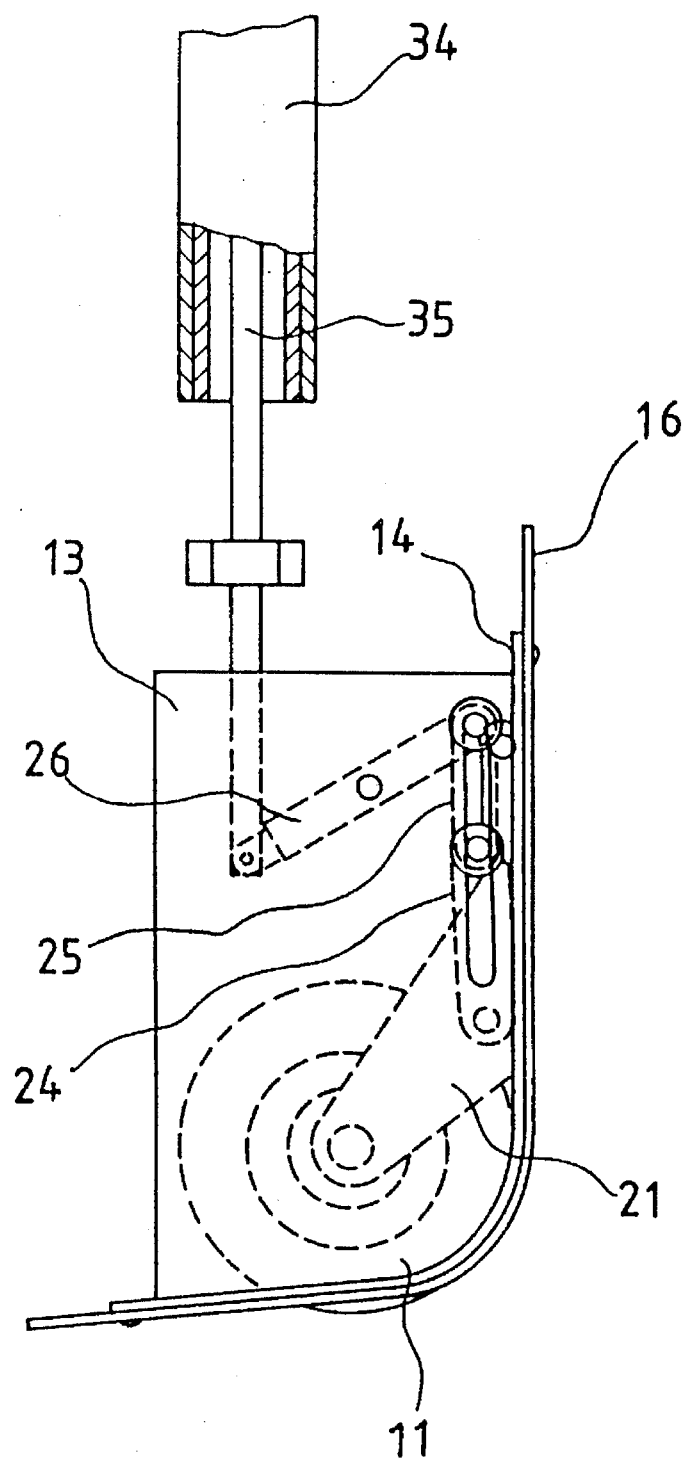
FIG. 5 shows a schematic view of the concealed caster according to the present invention.

According to the present invention, the caster 11 in use can be moved back in to remain concealed in the caster housing 13 by pushing downwards the inner control rod 35 of the drag frame 34. The downward movement of the inner control rod 35 triggers the levers 26 of move on the shaft 31 serving as a fulcrum. As a result, the guiding pieces 25 are caused to move upwards along the elongate slots 18. The action plate 24 then actuated by the guiding pieces 25 to cause the caster 11 to slide inwards on the shaft 23 serving as a center of circle. As the caster 11 is completely concealed in the caster housing 13, the action plate 24 is located in an upright position, as shown in FIG. 5.

Figure 6:
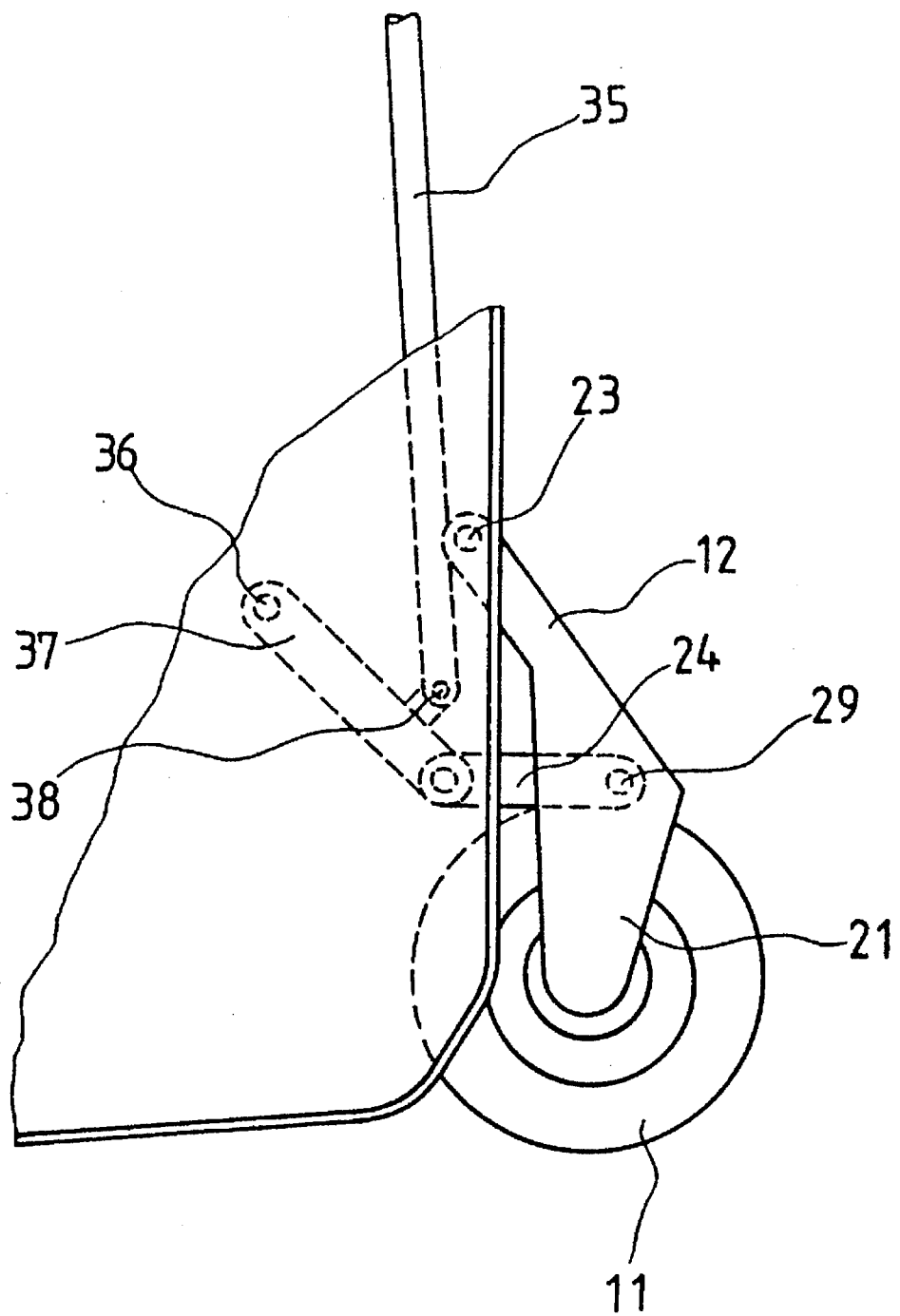
FIG. 6 shows a schematic view of another embodiment of the present invention in which the caster is in use.
Figure 7:
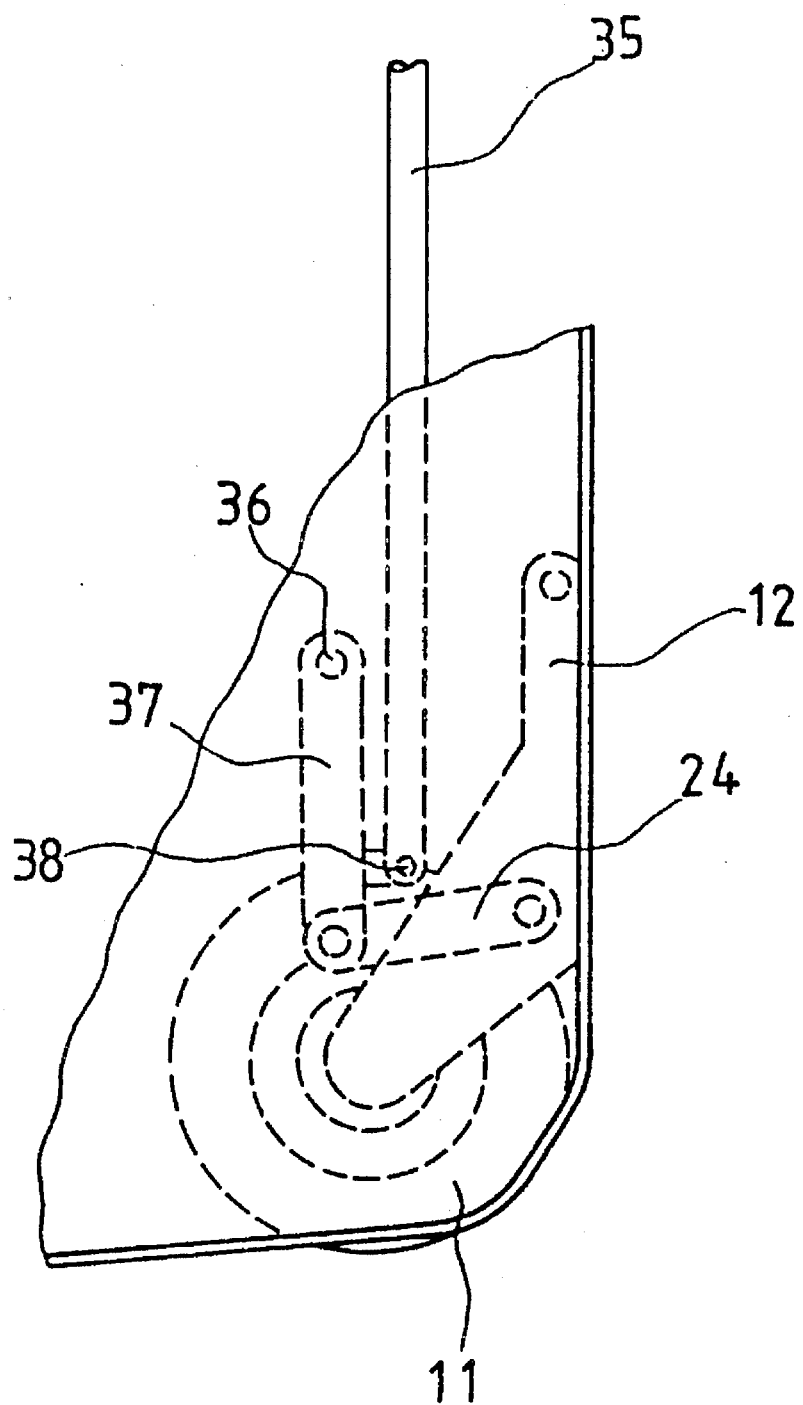
FIG. 7 shows a schematic view of the concealed caster according to the present invention as shown in FIG. 6.

Another embodiment of the present invention is illustrated in FIGS. 6 and 7 in which a lever 37 is intended to replace the guiding pieces 25, the levers 26 and the elongate slots 18 of the first embodiment of the present invention. The lever 37 has a fulcrum 36 which is located at one end thereof and is pivoted to the caster housing 13. The lever 37 is pivoted at another end thereof to the action plate 24. In addition, the lever 37 is provided with a pivoting point 38, which is adjacent to another end (front end) of ithe lever and is pivoted to one end of the inner control rod 35 of the drag frame 34.

The embodiments of the present invention described above are be regarded in all respects as merely illustrative and not restrictive. Accordingly, the present invention may be embodied in other specific forms without deviating from the spirit thereof. The present invention is therefore to be limited only by the scope of the following appended claims.

What is claimed is:

1. A concealable baggage caster comprising a caster housing dimensioned to house therein a caster of a baggage and a caster frame on which said caster is mounted, said caster housing having an open outer side and an open bottom side which are provided respectively with a folded edge to facilitate said caster housing to be fastened to a bottom edge of said baggage in conjunction with an L-shaped fastening piece provided therein with a through slot dimensioned to permit said caster to move freely therethrough, said caster housing further provided respectively in a left side wall thereof and a right side wall thereof with an elongate slot, a pivoting hole and a locating hole, said caster frame having two lugs between which said caster is mounted, with said caster frame being pivoted to said caster housing which is further provided therein with an action plate, two guiding pieces and two levers, said action plate being pivoted to said lugs of said caster frame, said two guiding pieces being pivoted to a shaft slidable along said elongate slots such that said two guiding pieces actuate said action plate, said two levers being provided respectively with a central fulcrum point fastened by a bolt shaft to said locating holes of said caster housing, said two levers being further provided jointly with a pivoting point which is fastened pivotally with one end of an inner control rod of a drag frame of said baggage.

2. The concealable baggage caster according to claim 1 wherein said guiding pieces, said levers and said elongate slots may be replaced by a lever piece having one end serving as a fulcrum, with said one end of said lever piece being pivoted to said caster housing, said lever piece further having another end which is pivoted to said action plate, said lever piece still further having a pivoting point fastened pivotally with one end of said inner control rod of said drag frame.

* * * * *